(12) United States Patent
Ruffa

(10) Patent No.: US 7,027,211 B1
(45) Date of Patent: Apr. 11, 2006

(54) FIBER OPTIC SWITCH EMPLOYING OPTICAL AMPLIFIERS

(75) Inventor: Anthony A. Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 198 days.

(21) Appl. No.: 10/748,922

(22) Filed: Dec. 8, 2003

(51) Int. Cl.
*H01S 3/00* (2006.01)
*G02B 6/42* (2006.01)

(52) U.S. Cl. ......................................... 359/333; 385/16

(58) Field of Classification Search .................. 385/15, 385/16; 359/333, 344
See application file for complete search history.

(56) References Cited

U.S. PATENT DOCUMENTS 5,655,036 A * 8/1997 Webb .......................... 385/15
5,991,476 A * 11/1999 Baney et al. .................. 385/16

FOREIGN PATENT DOCUMENTS

RU 2001135692/09 * 8/2003

* cited by examiner

*Primary Examiner*—Mark Hellner
(74) *Attorney, Agent, or Firm*—Jean-Paul A. Nasser; James M. Kasischke; Michael P. Stanley

(57) ABSTRACT

A method and apparatus of switching a digital signal from a single input optical fiber to one or more optical fibers comprising the steps of providing an input signal into the input optical fiber, splitting the input optical fiber to form a plurality of split optical fibers each carrying the input signal, amplifying the signal in at least one of the plurality of split optical fibers with a laser activated amplifier, and then attenuating the signal in all of the split optical fibers to produce at least one output signal in one or more of the designated split optical fibers.

18 Claims, 2 Drawing Sheets

FIBER OPTIC SWITCH EMPLOYING OPTICAL AMPLIFIERS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

This patent application is co-pending with a related patent application Ser. No. 10/748,921 also entitled A FIBER OPTIC SWITCH, by Anthony A. Ruffa the named inventor of this application.

BACKGROUND OF THE PRESENT INVENTION (1) Field of the Invention

The present invention relates to a method for switching a digital signal in an optical fiber from an input fiber to a plurality of output fibers and an apparatus for performing such switching. More specifically, the present invention relates to a method for switching a digital signal in an optical fiber from an input fiber to a plurality of output fibers by means of at least one laser-activated amplifier and a plurality of optical attenuators without requiring a conversion from an optical signal into an electrical signal and at high switching speeds.

(2) Description of the Prior Art

There exist numerous methodologies whereby optical signals may be switched from one fiber to another without first converting to an electronic signal and then back to an optical signal. Most of these methods involve some change in the medium to bend the light beam and achieve a physical switching of the input beam into two or more output beams. Some of the methods used include micro-electro-mechanical systems (MEMS), liquid crystals, tiny ink-jet bubbles, thermo-optical switches, tunable lasers, or using sound waves. As a result of requiring a change in the propagating medium to achieve switching, most of these switching methods have relatively slow switching speeds, e.g., on the order of 100 Hz. There are methods for switching light with light without changing the medium. These methods typically rely on nonlinearities. The problem with a nonlinear system is that it does not work well for switching broadband signals, which can be viewed as sums of narrowband signals. The sum of many narrowband signals will have a different response than the response of a single narrowband signal.

What is needed is a methodology for switching an optical input signal into a plurality of optical outputs that does not depend upon nonlinearities or upon the implementation of a change in medium giving rise to unacceptably slow switching speeds.

SUMMARY OF THE INVENTION

Accordingly, it is an object of the present invention to provide a method for switching an optical signal in a fiber optic assembly.

It is a further object of the present invention to provide a fiber optic switch for switching an optical signal in a fiber optic assembly.

The method disclosed herein is for use with a fiber optic system where the signals have one of two discrete power levels, one level representing "0" and the other representing "1". The method involves directing a digital input signal into an input optical fiber and then splitting the input signal into multiple input signals by splitting the input optical fiber to form a plurality of output optical fibers. Each output optical fiber carries a single one of the split input signals. This method further involves selectively amplifying one or more of the split input signals with a laser-activated amplifier. The amplification of the one or more split input signals is such that the power levels are much higher than the levels for the "0" and "1" states. Finally, all of the signals in the output optical fibers are attenuated.

In accordance with the present invention a fiber optic switch comprises an input optical fiber. An input signal is provided to the input optical fiber. At least one splitter is used to split the input signal and the input optical fiber to form a plurality of optical fibers and a plurality of split input signals. Each of the optical fibers carries a single split input signal. At least one laser activated amplifier controllably amplifies one of the split input signals and a plurality of attenuators attenuates the plurality of the split input signals to produce at least one output signal.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT(S)

The optical switch of the present invention switches a digital signal from an input optical fiber to one or more output optical fibers. The embodiments of the present invention, discussed more fully below, function in a fiber optic system using two discrete power states for "0" and "1". Switching is achieved by splitting an optical input signal into a plurality of signals, selectively amplifying certain of the split signals through a controller, and then attenuating all of the split signals to provide at least one output signal corresponding to the optical input signal.

Figure 1:
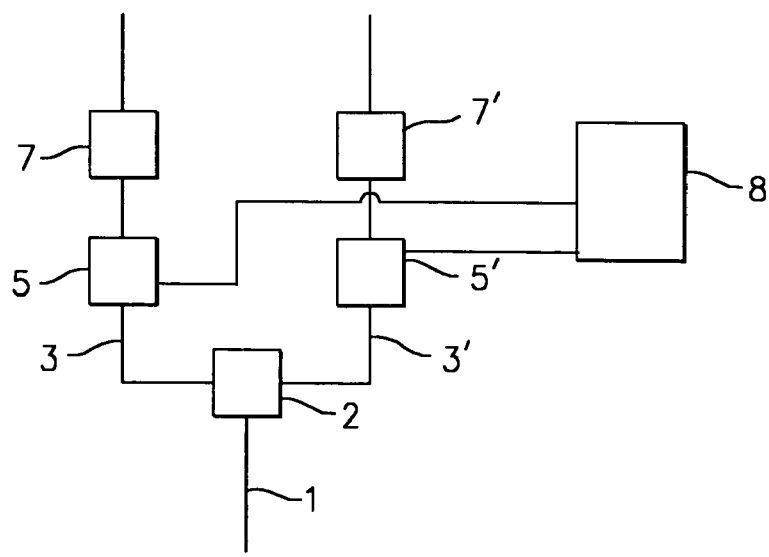
FIG. 1 provides a diagram of a fiber optic switch of the present invention.

With reference to FIG. 1, there is illustrated an embodiment of an optical switch of the present invention. The incoming signal to be switched is contained by fiber 1. The signal is split into two fibers 3, 3' with a splitter 2. Splitter 2 is a device well known in the art that divides a single incoming optical signal into at least two separate output signals such that each output signal corresponds to the incoming signal but is scaled to a lower intensity by division of the signal power.

Fibers 3, 3' each have an attached amplifier 5, 5'. Each amplifier 5, 5' amplifies the incoming signal in its respective fiber 3, 3' when a pumping laser (not shown) within the amplifier is turned on. As known in the art, these amplifiers can be constructed from doped fiber optic segments. The pumping laser can be electrically controlled or optically controlled by control 8. As a result of passing through amplifier 5, 5', each signal is amplified. Finally, each of the fibers in 3 and 3' pass through an attenuator 7, 7' that attenuates the signal by an amount identical to the amount amplified by the amplifier.

Therefore, in order to switch the signal from fiber 1 to fiber 3, controller 8 would deliver a control signal to amplifier 5 activating its pumping laser to amplify the received signal. Conversely, if the signal is to be switched from fiber 1 to fiber 3', controller 8 would cause amplifier 5' to be powered by its laser. In addition, controller 8 can switch the signal to both fibers 3, 3' by powering pumping lasers in both amplifiers 5, 5'.

In a fiber optic system having two discrete power states a "0" state may correspond to an optical power range between 0 and 1 mW, and a "1" state may correspond to a 3 to 4 mW range. In such a system, the digital signal in fiber 3 and 3' is amplified in amplifier 5 or 5' by a factor of 10 so that the "0" power range is increased to 0 to 10 mW and the "1" is increased to 30 to 40 mW. After amplification, the signals in both output fibers 3, 3' are attenuated by attenuators 7 and 7' by a factor of 10. In an example where the signal was amplified in fiber 3 but not fiber 3', then the attenuator 7' reduces the maximum power in the unamplified fiber 3', to 0.4 mW, well below the maximum threshold recognized as a "0". The signal will not be recognized in the unamplified output fiber 3', but it will be recognized in the amplified output fiber 3 because it was attenuated by the same amount as it was amplified. If the magnitude of amplification is equal to the original signal to noise ratio, then the signal to noise ratio for the signal in output fiber 3 will be approximately that of the signal in input fiber 1.

There are several optical amplifiers known in the art that could be used in the present invention. The most common optical amplifier that could be used is the erbium doped optical fiber amplifier, which operates at wavelengths from 1530 to 1610 nm, and encompasses the 1550 nm band used for fiber optic transmission (where the fiber is most transparent). Another common amplifier is the semiconductor optical amplifier. Other optical amplifiers having different wavelengths and modes of operation can be used within the scope of this invention. The response time for erbium doped optical fiber amplifier devices is currently in the microsecond range. The response time for semiconductor optical amplifier devices is in the nanosecond range. The switching speed of the present invention would therefore be dependant on the type of amplifying device used in the invention. It would, however, be of a considerably higher speed than a physical switching device that relies upon a change in medium.

In any of the embodiments of the present invention, the attenuators can be either a filter or partially opaque section of fiber. In the preferred embodiment of the invention, the amount of signal attenuation will equal the amount of signal amplification, and the amount of signal amplification ideally will be equal to or greater than the signal to noise ratio.

It is well known in the art that optical amplifiers decrease the output signal to noise ratio. The ratio of signal to noise ratio of the input signal to that of the output signal can be 5 to 10 dB, depending upon the amplifying device. In the present invention this does not present a problem, because there are only two power states in the optical fiber system. The signal to noise ratio requirements for a two state system are low. Therefore, other than a reduction in signal to noise ratio due to amplification, the signal to noise ratio of the signal in the input fiber 1 is otherwise preserved as it is ultimately amplified and attenuated to achieve switching the signal to a separate output fiber. Amplifying the digital signal first and then attenuating it maintains the ratio of signal power to optical noise floor power.

Figure 2:
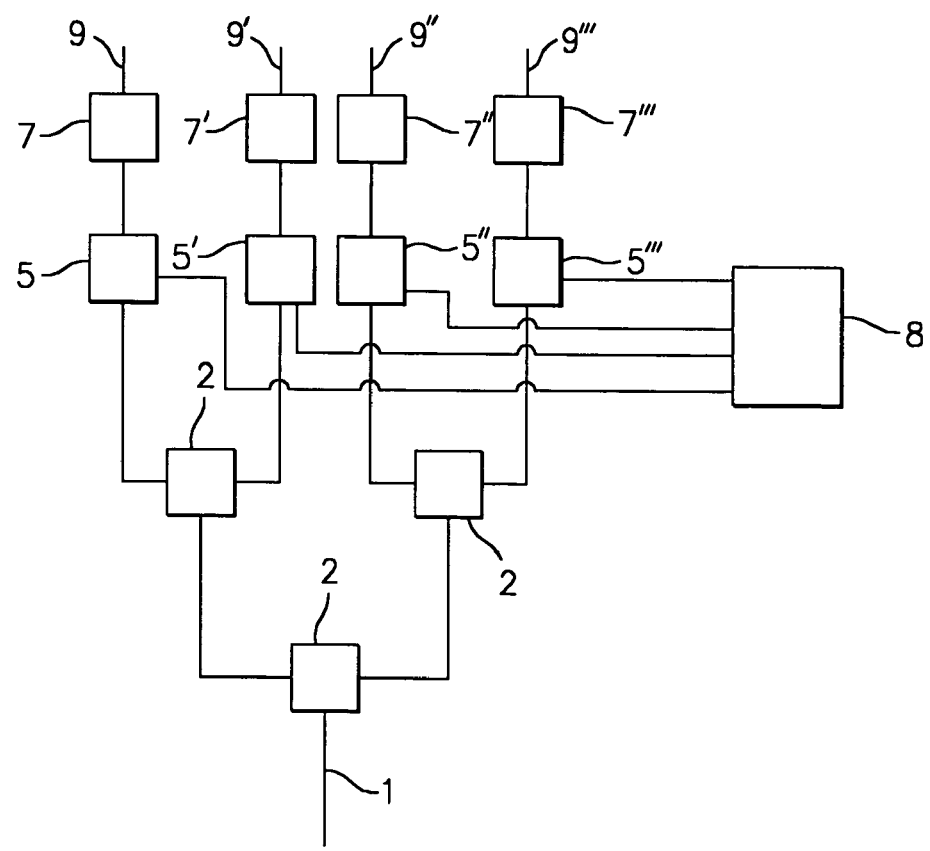
FIG. 2 provides a diagram of a fiber optic switch of the present invention illustrating multiple levels of binary switches.

The method and apparatus as described can be cascaded to switch an incoming signal to any desired number of optical fibers. FIG. 2 illustrates an incoming signal 1 that can be switched to any of four fibers 9, 9', 9", 9'" through the use of two levels of binary switches. As before, control 8 controls amplification at each amplifier 5, 5', 5", and 5'". Note that it is not in general necessary to amplify the signal and attenuate it at each switch. Rather, amplifiers 5, 5', 5", 5'" and attenuators 7, 7', 7", 7'", are located only at the terminus output fibers 9, 9', 9", 9'". Similarly, the signal from an incoming fiber can be diverted optically to any of $2^n$ fibers by increasing the number of levels of binary switches.

Figure 3:
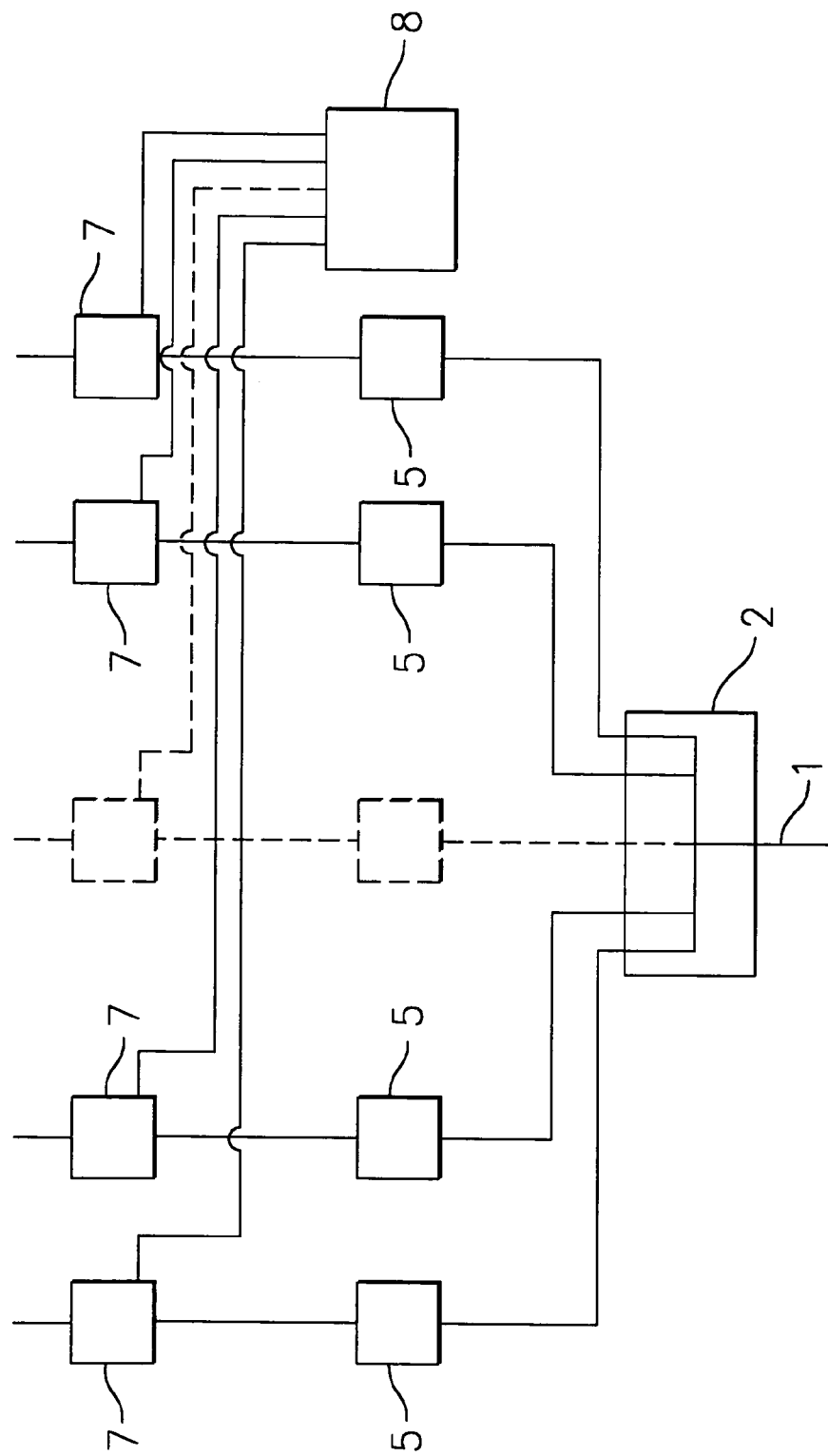
FIG. 3 provides a diagram of a configuration of the fiber optic switch of the present invention illustrating the extension to n output fibers.

FIG. 3 is a generalized embodiment of the present invention in which the signal in input fiber 1 is diverted into n output fibers. One or more splitters 2 create the desired number of outputs. In such an embodiment, each output fiber typically contains an amplifier 5 and an attenuator 7 as illustrated in FIG. 1.

The fiber optic switch disclosed can be generalized for an arbitrary broadband signal, so that such a signal can be optically switched from an input fiber to a plurality of output fibers. Each frequency will be equally amplified and attenuated. The only requirement is that there are only two discrete allowable states for each narrowband frequency component.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

What is claimed is:

1. A method of switching a binary digital signal having a discrete power level from a single input optical fiber to at least one output fiber comprising the steps of:
   providing an input signal into an input optical fiber;
   splitting said input signal repeatedly in a binary fashion N times to produce $2^N$ split input signals;
   selectively amplifying at least one of said $2^N$ split input signals with an amplifier; and
   attenuating each of said $2^N$ split input signals after said step of selectively amplifying.

2. The method of claim 1 wherein said selectively amplifying is accomplished through the use of a semiconductor optical amplifier.

3. The method of claim 1 wherein said selectively amplifying is accomplished through the use of an erbium doped optical fiber pumped by a laser.

4. The method of claim 1 wherein said selectively amplifying is accomplished through the use of a controller.

5. The method of claim 1 wherein attenuating each of said $2^N$ split input signals comprises filtering said split input signals.

6. The method of claim 1 wherein attenuating each of said $2^N$ split input signals comprises the step of passing said split input signals through a partially opaque section of fiber.

7. A fiber optic switch comprising:
   an input optical fiber capable of transmitting an input signal;
   at least one splitter joined to said input optical fiber for splitting said input optical fiber said at least one splitter arranged in a binary fashion N times to produce $2^N$ split optical fibers, each of said split optical fibers being capable of carrying said input signal;

at least one amplifier joined to each of said $2^N$ split optical fibers, each amplifier being controllable to amplify the signal in the joined one of the split optical fibers; and at least one attenuator joined to each amplifier to attenuate the signal in each of said $2^N$ split optical fibers.

8. The switch of claim 7 wherein said at least one amplifier is a semiconductor optical amplifier.

9. The switch of claim 7 wherein said at least one amplifier is an erbium doped optical fiber pumped by a laser.

10. The switch of claim 7 further comprising a controller joined to said at least one amplifier for selectively controlling the joined amplifier.

11. The switch of claim 7 wherein said at least one attenuator is an optical filter.

12. The switch of claim 7 wherein said at least one attenuator a partially opaque section of fiber.

13. A method of switching a binary digital signal having one of two discrete power levels representing 0 and 1 from a single input optical fiber to at least one output fiber comprising the steps of:

providing an input signal, having a signal to noise ratio, into an input optical fiber;

splitting said input signal repeatedly in a binary fashion N times to produce $2^N$ split input signals;

selectively amplifying at least one of said $2^N$ split input signals by a magnitude equal to the signal to noise ratio of said input signal through the use of a laser activated amplifier comprised of an erbium doped optical fiber pumped by a laser; and attenuating each of said $2^N$ split input signals by an amount identical to the amount amplified by said laser activated amplifier after said step of selectively amplifying said at least one of said $2^N$ split input signals, such that each of said $2^N$ input signals that were not first amplified are now attenuated to a power level of 0.

14. The method of claim 13 wherein the step of selectively amplifying at least one of said $2^N$ split input signals with a laser activated amplifier comprised of an erbium doped optical fiber pumped by a laser, comprises amplifying said at least one of said $2^N$ input signals by a magnitude greater than the signal to noise ratio of said input signal.

15. The method of claim 13 further comprising the step of delivering a control signal to said laser activated amplifier by means of a controller to amplify said at least one of said $2^N$ input signals.

16. The method of claim 15 further comprising the steps of establishing said two discrete power levels at 0 mw to 1 mw representing a 0 and at 3 mw to 4 mw representing a 1.

17. The method of claim 16 wherein the step of selectively amplifying at least one of said plurality of said $2^N$ split input signals with a laser activated amplifier comprising an erbium doped optical fiber pumped by a laser, further comprises amplifying said at least one of said $2^N$ input signals by a factor of 10.

18. The method of claim 17 wherein the step of attenuating each of said $2^N$ split input signals by an amount identical to the amount amplified by said laser activated amplifier after said step of selectively amplifying said at least one of said $2^N$ input signals further comprises attenuating each of said split input signals by a factor of 10.

* * * * *